(12) United States Patent
Kocal et al.

(10) Patent No.: US 8,927,793 B2
(45) Date of Patent: Jan. 6, 2015

(54) PROCESSES FOR CONVERTING LIGNOCELLULOSICS TO REDUCED ACID PYROLYSIS OIL

(75) Inventors: Joseph Anthony Kocal, Glenview, IL (US); Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 782 days.

(21) Appl. No.: 13/194,718

(22) Filed: Jul. 29, 2011

(65) Prior Publication Data
US 2013/0025187 A1 Jan. 31, 2013

(51) Int. Cl.
| | | |
|---|---|---|
| *C07C 1/00* | (2006.01) | |
| *C10K 1/00* | (2006.01) | |
| *C10K 1/34* | (2006.01) | |
| *C10K 3/02* | (2006.01) | |
| *C10B 49/22* | (2006.01) | |
| *C10B 53/02* | (2006.01) | |
| *C10B 57/06* | (2006.01) | |
| *C10B 57/18* | (2006.01) | |
| *C10C 5/00* | (2006.01) | |
| *B01J 23/00* | (2006.01) | |
| *B01J 23/02* | (2006.01) | |
| *B01J 29/08* | (2006.01) | |

(52) U.S. Cl.
CPC ... *C10K 1/00* (2013.01); *C10K 1/34* (2013.01); *C10K 3/026* (2013.01); *C10B 49/22* (2013.01); *C10B 53/02* (2013.01); *C10B 57/06* (2013.01); *C10B 57/18* (2013.01); *C10C 5/00* (2013.01); *B01J 23/007* (2013.01); *B01J 23/02* (2013.01); *B01J 29/082* (2013.01); *C10G 2300/1014* (2013.01); *Y02E 50/14* (2013.01)
USPC ................ 585/240; 585/242; 44/605; 44/606

(58) Field of Classification Search
CPC ............ C10G 3/42; C10G 3/49; C10G 45/04; C10G 2300/1011; C10B 53/02; C10B 57/00; Y02E 50/14
USPC .................... 585/240, 242; 44/605, 606, 307; 422/139
See application file for complete search history.

(56) References Cited

U.S. PATENT DOCUMENTS 2,177,557 A * 10/1939 Bergstrom et al. ........... 562/515
4,436,532 A    3/1984 Yamaguchi et al.
4,797,135 A * 1/1989 Kubat et al. ..................... 44/500
(Continued)

FOREIGN PATENT DOCUMENTS

KR          100857247 B1    9/2008

OTHER PUBLICATIONS

Putun, Ersan "Catalytic Pyrolysis of Biomass: Effects of Pyrolysis Temperature, Sweeping Gas Flow Rate and MgO Catalyst" Energy, v 35, n 7, p. 2761-2766, Jul. 2010; ISSN: 03605442; DOI: 10.1016/j.energy.2010.02.024; Publisher: Elsevier Ltd.

*Primary Examiner* — Nina Bhat

(57) ABSTRACT

Processes for producing reduced acid lignocellulosic-derived pyrolysis oil are provided. In a process, lignocellulosic material is fed to a heating zone. A basic solid catalyst is delivered to the heating zone. The lignocellulosic material is pyrolyzed in the presence of the basic solid catalyst in the heating zone to create pyrolysis gases. The oxygen in the pyrolysis gases is catalytically converted to separable species in the heating zone. The pyrolysis gases are removed from the heating zone and are liquefied to form the reduced acid lignocellulosic-derived pyrolysis oil.

20 Claims, 1 Drawing Sheet

(56) References Cited

U.S. PATENT DOCUMENTS

| | | |
|---|---|---|
| 7,846,978 B2 | 12/2010 | Olah et al. |
| 8,022,260 B2 * | 9/2011 | O'Connor et al. ............ 585/242 |
| 8,043,391 B2 * | 10/2011 | Dinjus et al. ................ 48/197 R |
| 8,236,173 B2 * | 8/2012 | Bartek et al. ................. 208/400 |
| 8,519,203 B2 * | 8/2013 | Marinangeli et al. ........ 585/240 |
| 2009/0308787 A1 | 12/2009 | O'Connor et al. |
| 2010/0105970 A1 | 4/2010 | Yanik et al. |
| 2010/0162625 A1 | 7/2010 | Mills |
| 2010/0163395 A1 * | 7/2010 | Henrich et al. ................ 201/2.5 |
| 2010/0275507 A1 | 11/2010 | O'Connor et al. |
| 2010/0294643 A1 | 11/2010 | O'Connor |
| 2010/0312028 A1 | 12/2010 | Olson et al. |
| 2011/0023565 A1 | 2/2011 | Yanik et al. |
| 2011/0213188 A1 * | 9/2011 | Agblevor et al. ............ 585/242 |

* cited by examiner

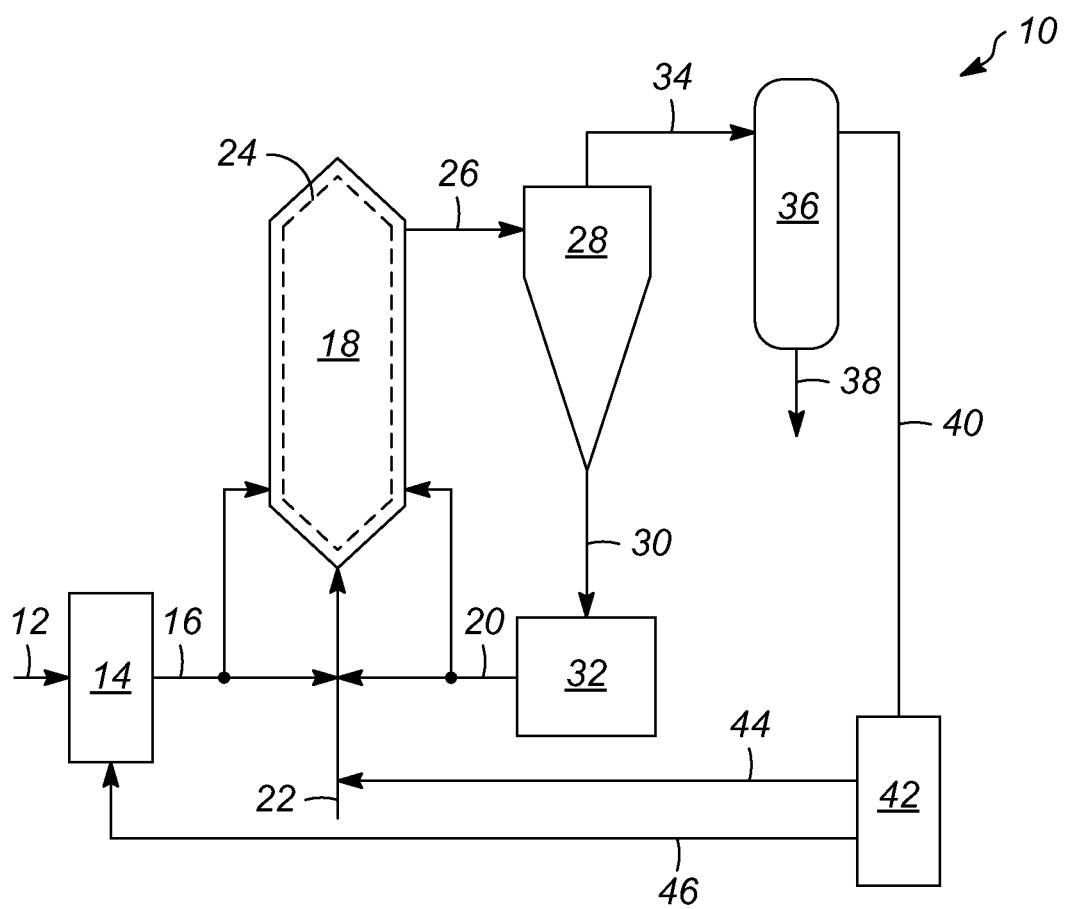

PROCESSES FOR CONVERTING LIGNOCELLULOSICS TO REDUCED ACID PYROLYSIS OIL

STATEMENT REGARDING FEDERALLY SPONSORED RESEARCH OR DEVELOPMENT

This invention was made under the partial support of the United States Government, United States Department of Energy under Award No. DE-FG36-08GO18213. The United States Government has certain rights in the invention.

FIELD OF THE INVENTION

The present invention generally relates to processes for producing reduced acid pyrolysis oil, and more particularly relates to processes for converting lignocellulosic material into reduced acid pyrolysis oil.

BACKGROUND OF THE INVENTION

Fast pyrolysis is a thermal process during which solid biomass feedstock containing lignocellulosic material, i.e., plant and algae matter including dedicated energy crops, wood waste, and agricultural waste, is rapidly heated to pyrolysis temperatures of about 300° C. to about 900° C. in the absence of air using a pyrolysis reactor. Under these conditions, solid and gaseous pyrolysis products are formed. A vapor portion of the gaseous pyrolysis products can be condensed into biomass-derived pyrolysis oil.

Biomass-derived pyrolysis oil can serve as a potential feedstock in the production of biofuels in petroleum refineries or in stand-alone process units. In fact, biomass-derived pyrolysis oil has the potential to replace up to 60% of transportation fuels, thereby reducing the dependency on conventional petroleum and reducing its environmental impact. However, biomass-derived pyrolysis oil is a complex, highly oxygenated organic liquid having properties that currently limit its utilization as a fuel. For example, conventional biomass-derived pyrolysis oil has high acidity (with a low pH and high total acid number (TAN)) making it corrosive to storage, pipes, and downstream equipment. Conventional biomass-derived pyrolysis oil typically has a pH of less than 3 and a TAN greater than 150. Further, conventional biomass-derived pyrolysis oil has low energy density and susceptibility to increased viscosity over time. The high acidity and low energy density of the biomass-derived pyrolysis oil is attributable in large part to oxygenated hydrocarbons in the oil, particularly carboxylic acids such as formic acid, acetic acid, etc. The oxygenated hydrocarbons in the oil are derived from oxygenated hydrocarbons in the gaseous pyrolysis products produced during pyrolysis.

To convert conventional biomass-derived pyrolysis oil into usable fuel for power or heat generation, or for transportation uses, further processing is required to reduce its acidity (as measured by an increase in pH). Often, this processing results in phase instability of the biomass-derived pyrolysis oil. Also, the processing can be quite costly, including high costs for hydrogen used in acidity reduction.

Accordingly, it is desirable to provide processes for converting lignocellulosic material into pyrolysis oil having reduced acidity. It is also desirable to produce lignocellulosic-derived pyrolysis oils having reduced acid and increased energy density. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Processes are provided for producing reduced acid lignocellulosic-derived pyrolysis oil. In accordance with one exemplary embodiment, a process for producing reduced acid lignocellulosic-derived pyrolysis oil feeds a lignocellulosic material to a heating zone. A basic solid catalyst is also delivered to the heating zone. In the heating zone, the lignocellulosic material is pyrolyzed in the presence of the basic solid catalyst to create pyrolysis gases. Oxygen in the pyrolysis gases is catalytically converted to separable species in the heating zone. The pyrolysis gases are removed from the heating zone and are liquefied to form the reduced acid lignocellulosic-derived pyrolysis oil.

In accordance with another embodiment, a process is provided for producing reduced acid pyrolysis oil from lignocellulosic material. In the process, the lignocellulosic material is rapidly heated in the presence of a basic solid catalyst and is pyrolyzed to create pyrolysis gases. Oxygen in the pyrolysis gases is catalytically converted to separable species. The pyrolysis gases are liquefied to form the reduced acid pyrolysis oil.

Another process for producing reduced acid pyrolysis oil from lignocellulosic material includes pyrolyzing the lignocellulosic material in the presence of a basic solid catalyst to create pyrolysis gases. Oxygen in the pyrolysis gases is converted to separable species through interaction with the basic solid catalyst. The pyrolysis gases are liquefied to form the reduced acid pyrolysis oil.

BRIEF DESCRIPTION OF THE DRAWING

The present invention will hereinafter be described in conjunction with the following drawing FIGURE wherein:

FIG. 1 is a schematic depiction of an apparatus for producing reduced acid pyrolysis oil from lignocellulosic material in accordance with an exemplary embodiment.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments contemplated herein are directed to a process for producing reduced acid pyrolysis oils from lignocellulosic material. It should be appreciated that while the oil produced according to the exemplary embodiments is generally described herein as a "reduced acid pyrolysis oil", this term generally includes any oil produced having a lower acidity than a pyrolysis oil conventionally produced from the same feedstock. The reduced acid lignocellulosic-derived pyrolysis oil has higher energy density than conventional lignocellulosic-derived pyrolysis oil. "Higher energy density" as used herein means that the reduced acid lignocellulosic-derived pyrolysis oil has an increased heat of combustion as compared to conventional lignocellulosic-derived pyrolysis oil. An increased heat of combustion increases the suitability of the oil as fuel and biofuel.

Referring to FIG. 1, in an exemplary embodiment, an apparatus 10 for producing reduced acid lignocellulosic-derived pyrolysis oil begins receives a lignocellulosic material feedstock 12. The lignocellulosic material feedstock 12 comprises biomass material such as plant and algae matter including dedicated energy crops, wood waste, agricultural waste/residues, bark, nuts and seeds, algae, grasses, forestry residues, cellulose and lignin, or the like. In one embodiment, the lignocellulosic material feedstock 12 has a water content of about 30 wt. % (weight percent). For improved performance in the exemplary process, the lignocellulosic material feedstock 12 is dried by a dryer 14, for example, until it has a water content of about 20 wt. %, or more preferably about 10 wt. % or less. The dried feedstock 16 is then fed to a heating unit 18, such as a pyrolysis reactor. As shown, the dried feedstock 16 may be fed to the heating unit 18 through two different routes.

Specifically, as shown, the dried feedstock 16 may be mixed with a basic solid catalyst 20 and a fluidized gas stream 22 before entering the heating unit 18. Alternatively, as shown, the dried feedstock 16 may be mixed with the basic solid catalyst 20 and the fluidized gas stream 22 after entering the heating unit 18. Both embodiments are depicted in FIG. 1. In exemplary embodiments, the basic solid catalyst 20 may be an oxide, such as calcium oxide (CaO) or magnesium oxide (MgO), a basic zeolite catalyst such as cesium X (CsX) zeolite, or a mineral, such as hydrotalcite, and may be formed by spray drying to a desired particle size range. For instance, in certain embodiments the FCC particle size is in the range of 10 to 150 micrometers. The fluidized gas stream 22 may be formed by nitrogen or other non-combustible gas.

As shown in FIG. 1, the heating unit 18 defines a heating zone 24. In the exemplary embodiment, the dried feedstock 16 is rapidly heated in the heating zone 24 to a temperature of at least about 450° C., and preferably between about 490° C. and about 510° C. in the presence of the basic solid catalyst 20. The residence time of the dried feedstock 16 and basic solid catalyst 20 in the heating zone 24 is short, typically less than 5 seconds, and preferably only 2 to 3 seconds. Thus, the heating rate is high, about 100 to 1000 K/s (kelvin per second).

As a result of the rapid heating, the dried feedstock 16 is pyrolyzed and thermochemically decomposes into pyrolysis gases. Due to the thermochemical decomposition of the dried feedstock 16, a variety of gaseous compounds are formed, such as aromatics, alkanes, alkynes, ketones, aldehydes, carboxylic acids, esters, ethers, alcohols, and other oxygenates. Overall, the pyrolysis gases have a high acidity and high total acid number.

However, in the presence of the basic solid catalyst 20 in the heating zone 24, at least some oxygenates within the pyrolysis gases, such as, for example, the carboxylic acids, are converted to separable species, such as carbon monoxide, carbon dioxide, and water. In addition to carboxylic acids, other oxygenates, including aldehydes, are converted to separable species through use of the basic solid catalyst 20. In exemplary embodiments, the basic solid catalyst 20 converts at least 30% of the non-water oxygen in the pyrolysis gases into the separable species, including converting at least 50% of the carboxylic acids, or, preferably, at least 90% of the carboxylic acids.

Because of the high temperature conditions and the variety of gaseous compounds in the pyrolysis gases, which may change depending on the source of the dried feedstock 16, there are a number of chemical mechanisms that provide for the conversion of oxygen-containing species in the pyrolysis gases to carbon oxides and water. Without wishing to be bound by theory, it is believed that the basic solid catalyst 20 may neutralize certain compounds to form water. Further, the basic solid catalyst 20 may support depolymerization, decomposition, and deoxygenation reactions forming carbon monoxide and carbon dioxide, among other reactions.

As shown, a stream 26 containing used or spent basic solid catalyst and the pyrolysis gases, including those catalytically converted to separable species, exits the heating unit 18. The stream 26 is fed to a phase separator 28, such as a cyclone or a filter. The phase separator 28 separates the used basic solid catalyst 30 and sends it to a regenerator 32. The regenerator 32 can be a combustion reactor that is able to combust coke or other deposits on the used basic solid catalyst 30 to regenerate the basic solid catalyst 20. While FIG. 1 illustrates a complete recovery of basic solid catalyst 20, fresh basic solid catalyst may be added to the heating unit 18 as well.

While the illustrated embodiment depicts the use of a fluidized circulating bed of basic solid catalyst 20, it is to be appreciated that a fixed catalyst bed, or other catalyst interaction system can be used. However, the fluidized circulating bed is preferred because it provides the ability to frequently regenerate the basic solid catalyst 20.

Referring back to the phase separator 28, it may be seen that pyrolysis gases 34 separated from the used basic solid catalyst 30 are routed to a liquefier 36. In the liquefier 36, the pyrolysis gases are liquefied to form pyrolysis oil 38 while the non-compressible carbon oxides of the non-separable species, discussed below, remain gaseous. While water will not be separated from the pyrolysis oil 38 during the gas-liquid phase separation caused by the liquefier 36, it can be separated from the pyrolysis oil 38 in a liquid-liquid separation.

As shown in FIG. 1, a hot gas stream 40 containing the non-compressible gases such as carbon oxides and nitrogen exits the liquefier 36 and may be delivered to another separator 42. Separator 42 may remove the fluidized gas from the hot gas stream 40 to form stream 44 for mixing with the fluidized gas stream 22. Further, the other hot components of the hot gas stream 40 are formed into stream 46 which can be used to dry the incoming lignocellulosic feedstock 12 in the dryer 14. Specifically, the stream 46 may be blown across the lignocellulosic feedstock 12 in the dryer 14.

The pyrolysis oil 38 produced under the process described herein has a reduced acidity compared to conventionally produced lignocellulosic-derived pyrolysis oil. Specifically, conventional oil typically has a total acid number of greater than 150. The pyrolysis oil 38 produced under the present process has a total acid number less than 100, and preferably equal to or less than 75. Further, the pyrolysis oil 38 of the present process preferably includes substantially no carboxylic acid, thus resulting in a reduced oxygen content.

As a result of its reduced total acid number and reduced acidity, the pyrolysis oil 38 produced by the process herein is substantially less corrosive than conventional lignocellulosic-derived pyrolysis oil. Therefore, the pyrolysis oil 38 produced herein may be used directly in power generation without the risk of damage to generator components. As the pyrolysis oil 38 produced herein has a reduced amount of oxygen, it has an increased heat value. Also, the pyrolysis oil 38 produced herein may be processed further for use as a transportation fuel. Due to the significantly reduced amount of oxygen in the pyrolysis oil 38, the processing costs, particularly hydrogen costs for deoxygenation, are greatly reduced as compared to processing conventional pyrolysis oil for use as transportation fuel.

It is to be appreciated that the reduced acid lignocellulosic-derived pyrolysis oil is substantially homogenous, with an energy density higher than that of conventional lignocellulosic-derived pyrolysis oil. The increased pH, phase homogeneity, and higher energy density of the reduced acid lignocellulosic-derived pyrolysis oil produced in accordance with exemplary embodiments as described herein improve its suitability as a fuel and biofuel.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for producing reduced acid lignocellulosic-derived pyrolysis oil comprising:
    feeding lignocellulosic material to a heating zone;
    delivering a basic solid catalyst to the heating zone;
    pyrolyzing the lignocellulosic material in the presence of the basic solid catalyst in the heating zone to create pyrolysis gases;
    catalytically converting oxygen in the pyrolysis gases to separable species in the heating zone, the pyrolysis gases including carboxylic acids and wherein more than 30% of the carboxylic acids are converted;
    removing the pyrolysis gases from the heating zone; and
    liquefying the pyrolysis gases to form the reduced acid lignocellulosic-derived pyrolysis oil.

2. The process of claim 1 wherein liquefying comprises separating the separable species from the pyrolysis oil.

3. The process of claim 1 wherein catalytically converting oxygen results in at least one of carbon monoxide, carbon dioxide, and water.

4. The process of claim 1 wherein pyrolyzing comprises heating the lignocellulosic material in the presence of the basic solid catalyst to a temperature of at least about 450° C. for less than about 5 seconds.

5. The process of claim 1 further comprising drying the lignocellulosic material, wherein the dried lignocellulosic material has a water content of less than about 20 wt. %.

6. The process of claim 5 wherein drying comprises directing a stream of the separable species across the lignocellulosic material.

7. The process of claim 1 wherein delivering the basic solid catalyst to the heating zone comprises feeding the solid basic catalyst selected from the group consisting of calcium oxide, magnesium oxide, cesium X zeolite, hydrotalcite, and combinations thereof to the heating zone.

8. The process of claim 1 wherein the basic solid catalyst is removed from the heating zone with the pyrolysis gases, the process further comprising:
    separating the pyrolysis gases from the basic solid catalyst; and
    regenerating the basic solid catalyst, wherein the regenerated basic solid catalyst is delivered to the heating zone.

9. The process of claim 8 wherein regenerating comprises combusting deposits on the basic solid catalyst.

10. The process of claim 1 wherein feeding and delivering comprise:
    mixing the lignocellulosic material and the basic solid catalyst in a stream; and
    flowing the stream through the heating zone.

11. The process of claim 1 wherein catalytically converting converts more than 50% of the carboxylic acids from the pyrolysis gases in the heating zone.

12. A process for producing reduced acid pyrolysis oil from lignocellulosic material comprising:
    rapidly heating the lignocellulosic material in the presence of a basic solid catalyst and pyrolyzing the lignocellulosic material to create pyrolysis gases;
    catalytically converting oxygen in the pyrolysis gases to separable species, the pyrolysis gases including carboxylic acids and wherein more than 30% of the carboxylic acids are converted; and
    liquefying the pyrolysis gases to form the reduced acid pyrolysis oil.

13. The process of claim 12 wherein liquefying comprises separating the separable species from the pyrolysis oil, and wherein the separable species comprise at least one of carbon monoxide, carbon dioxide, and water.

14. The process of claim 12 wherein rapidly heating comprises rapidly heating in the presence of the solid basic catalyst selected from the group consisting of calcium oxide, magnesium oxide, cesium X zeolite, hydrotalcite, and combinations thereof.

15. The process of claim 12 wherein the lignocellulosic material is rapidly heated to a temperature of at least about 450° C. for less than about 5 seconds.

16. The process of claim 12 further comprising:
    separating the pyrolysis gases from the basic solid catalyst; and
    regenerating the basic solid catalyst.

17. The process of claim 12 further comprising mixing the lignocellulosic material and the basic solid catalyst in a stream, wherein the stream is flowed through a heating zone to rapidly heat the lignocellulosic material in the presence of the basic solid catalyst.

18. The process of claim 12 wherein catalytically converting converts more than 50% of the carboxylic acids from the pyrolysis gases.

19. A process for producing reduced acid pyrolysis oil from lignocellulosic material comprising:
    pyrolyzing the lignocellulosic material in the presence of a basic solid catalyst to create pyrolysis gases;
    converting oxygen in the pyrolysis gases to separable species through interaction with the basic solid catalyst, the pyrolysis gases including carboxylic acids and wherein more than 30% of the carboxylic acids are converted; and
    liquefying the pyrolysis gases to form the reduced acid pyrolysis oil.

20. The process of claim 19 wherein pyrolyzing comprises:
    mixing the lignocellulosic material and the basic solid catalyst in a stream; and
    heating the stream to a temperature of at least 450° C. for less than 5 seconds.

* * * * *